United States Patent
Kato et al.

(10) Patent No.: US 7,464,778 B2
(45) Date of Patent: Dec. 16, 2008

(54) CARGO HANDLING APPARATUS OF CARGO HANDLING INDUSTRIAL VEHICLE

(75) Inventors: Norihiko Kato, Aichi (JP); Masaru Sugai, Aichi (JP)

(73) Assignee: Kabushiki Kaisha Toyota Jidoshokki, Kariya-Shi (JP)

( * ) Notice: Subject to any disclaimer, the term of this patent is extended or adjusted under 35 U.S.C. 154(b) by 542 days.

(21) Appl. No.: 10/567,531

(22) PCT Filed: Mar. 28, 2005

(86) PCT No.: PCT/JP2005/005706

§ 371 (c)(1),
(2), (4) Date: Feb. 6, 2006

(87) PCT Pub. No.: WO2005/100230

PCT Pub. Date: Oct. 27, 2005

(65) Prior Publication Data

US 2008/0190703 A1    Aug. 14, 2008

(30) Foreign Application Priority Data

Apr. 13, 2004    (JP) .............................. 2004-118222

(51) Int. Cl.
- B60K 1/00 (2006.01)
- B60K 6/00 (2007.10)
- B60K 17/00 (2006.01)
- B66F 9/06 (2006.01)
- B66F 9/20 (2006.01)

(52) U.S. Cl. .................... 180/65.2; 180/65.1; 180/305; 180/306; 187/222; 187/224; 187/233

(58) Field of Classification Search ............... 180/65.1, 180/65.2, 305, 306; 903/912; 187/222, 224, 187/233
See application file for complete search history.

(56) References Cited

U.S. PATENT DOCUMENTS 6,190,282 B1 *  2/2001  Deguchi et al. ................. 477/5

FOREIGN PATENT DOCUMENTS

| EP | 0 822 113 A2 | 2/1998 |
| EP | 1 366 949 A1 | 12/2003 |
| JP | 2000-287305 | 10/2000 |
| JP | 2000-313600 | 11/2000 |

OTHER PUBLICATIONS

European Search Report dated Mar. 26, 2008 issued by European Patent Office for application No. 05727165.2-2316 PCT/JP2005005706.

* cited by examiner

*Primary Examiner*—Christopher P Ellis
*Assistant Examiner*—John R Olszewski
(74) *Attorney, Agent, or Firm*—Morgan & Finnegan, LLP

(57) ABSTRACT

Provided are an engine 111, a generator-motor 113, a clutch 112 connecting/disconnecting power therebetween, a battery 115, and a loading pump 117 for driving a fork 118. The generator-motor 113 is set either in a generator mode or in a motor mode. When a cargo handling load (detected by a loading lever position sensor 145 and the like) is smaller than a predetermined value, the clutch 112 is set to a disconnection state, the engine 111 is stopped or idled, and the loading pump 117 is driven by the generator-motor 113 in the motor mode. When the load is increased to the predetermined value or more during cargo handling work in a state where the clutch 112 is released, an increase of the number of revolution of the engine is started while an output of the generator-motor 113 is being increased. When the number of revolution of the engine 111 is made equal to the number of revolution of the generator-motor 113, the clutch 112 is set to a connected state, and the loading pump 117 is driven by the engine 111.

11 Claims, 6 Drawing Sheets

CARGO HANDLING APPARATUS OF CARGO HANDLING INDUSTRIAL VEHICLE

TECHNICAL FIELD

The present invention relates to a so-called hybrid handling apparatus provided for a cargo handling industrial vehicle.

BACKGROUND ART

As this type of cargo handling apparatus, for example, there is a cargo handling apparatus of a forklift, which is disclosed in undermentioned Document 1. This cargo handling apparatus includes an engine, a generator-motor, a battery, and a fork. Then, the generator-motor is driven either in a generator mode in which the generator-motor is driven by the engine to generate electric power or in a motor mode in which the generator-motor is driven as a motor by receiving electric drive power from the battery. The cargo handling apparatus is made switchable between a first drive mode in which the cargo handling apparatus is driven by the engine to perform cargo handling work and a second drive mode in which the cargo handling apparatus is driven by the engine and the generator-motor in the motor mode to perform the cargo handling work.

According to the construction disclosed in Document 1, the engine that has been exclusively provided for driving the generator heretofore is concurrently used for driving the fork, thus making it possible to omit a cargo motor for driving the fork, to thereby achieve simplification of the construction of the apparatus.

Further, in undermentioned Document 2, there is disclosed a control system in which: a construction to interpose a clutch between the engine and the generator-motor is first adopted in a so-called hybrid automobile; when acceleration is made to a motor-creep state where the generator-motor is slightly driven and the engine is stopped, it is determined by a throttle opening whether the acceleration is rapid or slow; in case of the rapid acceleration, the number of revolution of the motor is increased; and when the number of revolution concerned reaches a predetermined number of revolution, the clutch is set to a connected state, thereby starting the engine.

The construction in Document 2 achieves ensuring of acceleration responsiveness by increasing a number of revolution of the generator-motor at first without starting the engine when the rapid acceleration is required.

[Document 1] JP 2000-313600 A
[Document 2] JP 2000-287305 A

Here, in a cargo handling industrial vehicle such as a forklift, a load of the cargo handling work is often largely varied. Specifically, while a considerably high output is required in case of carrying a very heavy cargo, a low output is sufficient in case of carrying a relatively lightweight cargo. Hence, when such a cargo handling load is small, it is inefficient to drive the fork by a large output of the engine, and it is therefore preferable to drive the fork only by the generator-motor while stopping the engine or setting the engine in an idle state.

However, from this viewpoint, in the construction of the above-described Document 1, since the engine and the generator-motor are mechanically coupled to each other (second sentence of Paragraph 0008 in Document 1), a large load is applied to the generator-motor from the engine side in case of driving the generator-motor in a state where the engine is stopped.

Accordingly, as in the above-described Document 2, it is conceivable to apply a construction which provides the clutch between the engine and the generator-motor, and to release the clutch in the state where the engine is stopped, thereby avoiding the large load as described above, which results from driving the fork only by the generator-motor (hereinafter, this construction is referred to as "Comparative example").

DISCLOSURE OF THE INVENTION

Problems to be Solved by the Invention

However, as described above, since fluctuations in the load of the cargo handling work are radical, problems as below occur. That is, there is a case where, when the cargo handling work is performed by driving the fork only by the generator-motor while the engine is stopped in a state where the clutch is released, the cargo handling load is radically increased because, for example, a heavy cargo starts to be lifted. In this case, it is conceivable to directly apply the control of the case of the rapid acceleration of Document 2 in the above-described Comparative example to set the clutch in the connected state, thereby starting the engine. However, since large torque is necessary in order to start the stopped engine, a large load is rapidly applied from the engine side to the generator-motor rotating by the high output, and it is therefore difficult to say that the problem of the above-described Document 1 can be substantially solved. Further, there is also a fear in that responsiveness to the cargo handling work is lowered because the number of revolution of the generator-motor is temporarily lowered at the time of clutch connection. Further, a load on the clutch is large, and a lifetime of the clutch is shortened.

Means for Solving the Problems

According to the present invention, a cargo handling apparatus of a cargo handling industrial vehicle includes: an engine; a generator-motor; a clutch for connecting/disconnecting a transmission of power between the engine and the generator-motor; electric storage means connected to the generator-motor; cargo handling means for performing cargo handling work; load detection means for detecting a magnitude of a cargo handling load; and a controller, in which the generator-motor is driven in one of: a generator mode of generating electric power by being driven by power of the engine and storing the electric power in the electric storage means, the power of engine being transmitted through the clutch; and a motor mode of being driven as a motor by receiving a supply of electric power from the electric storage means.

When the load detected by the load detection means is smaller than a predetermined value, the controller sets the engine in a stopped or idle state, disconnects the transmission of the power between the engine and the generator-motor by the clutch, and drives the cargo handling means by the generator-motor in the motor mode, thereby performing the cargo handling work, when the load detected by the load detection means becomes the predetermined value or more during the cargo handling work in a state where the transmission of the power between the engine and the generator-motor is disconnected by the clutch, the controller starts an increase of the number of revolution of the engine while increasing an output of the generator-motor in the motor mode, and when the number of revolution of the engine is made equal to the number of revolution of the generator-motor, the controller connects the transmission of the power between the engine and the generator-motor by the clutch, and drives the cargo handling means by both of the power of the engine and the power of the generator-motor, thereby performing the cargo handling work.

Note that the "increase of the load to the predetermined value or more" includes the case where a degree of radicalness of the increase of the load is a predetermined degree of radicalness or more, and also includes the case where the load itself is a predetermined value or more. The same can be said in the following description.

Effects of the Invention

According to the present invention, when the cargo handling load is smaller than the predetermined value, the transmission of the power between the engine and the generator-motor is disconnected by the clutch, the cargo handling means is driven by the generator-motor in the motor mode, and the engine is idled or stopped, thus making it possible to enhance energy efficiency. Then, when the cargo handling load is increased to the predetermined value or more, the control to increase the output of the generator-motor is first performed to thereby ensure the responsiveness. Further, when the increase of the cargo handling load is detected, the number of revolution of the engine is increased, and when the number of revolution of the engine is made equal to the number of revolution of the generator-motor, the transmission of the power between the engine and the generator-motor is connected by the clutch. Accordingly, the large load is prevented from being applied to the generator-motor from the engine side. Further, the clutch is set to the connected state when the number of revolution of the engine and the number of revolution of the generator-motor coincide with each other. Accordingly, the load on the clutch can also be reduced.

BEST MODE FOR CARRYING OUT THE INVENTION

Hereinafter, description will be made of embodiments of the present invention with reference to the accompanying drawings.

First Embodiment

Figure 1:
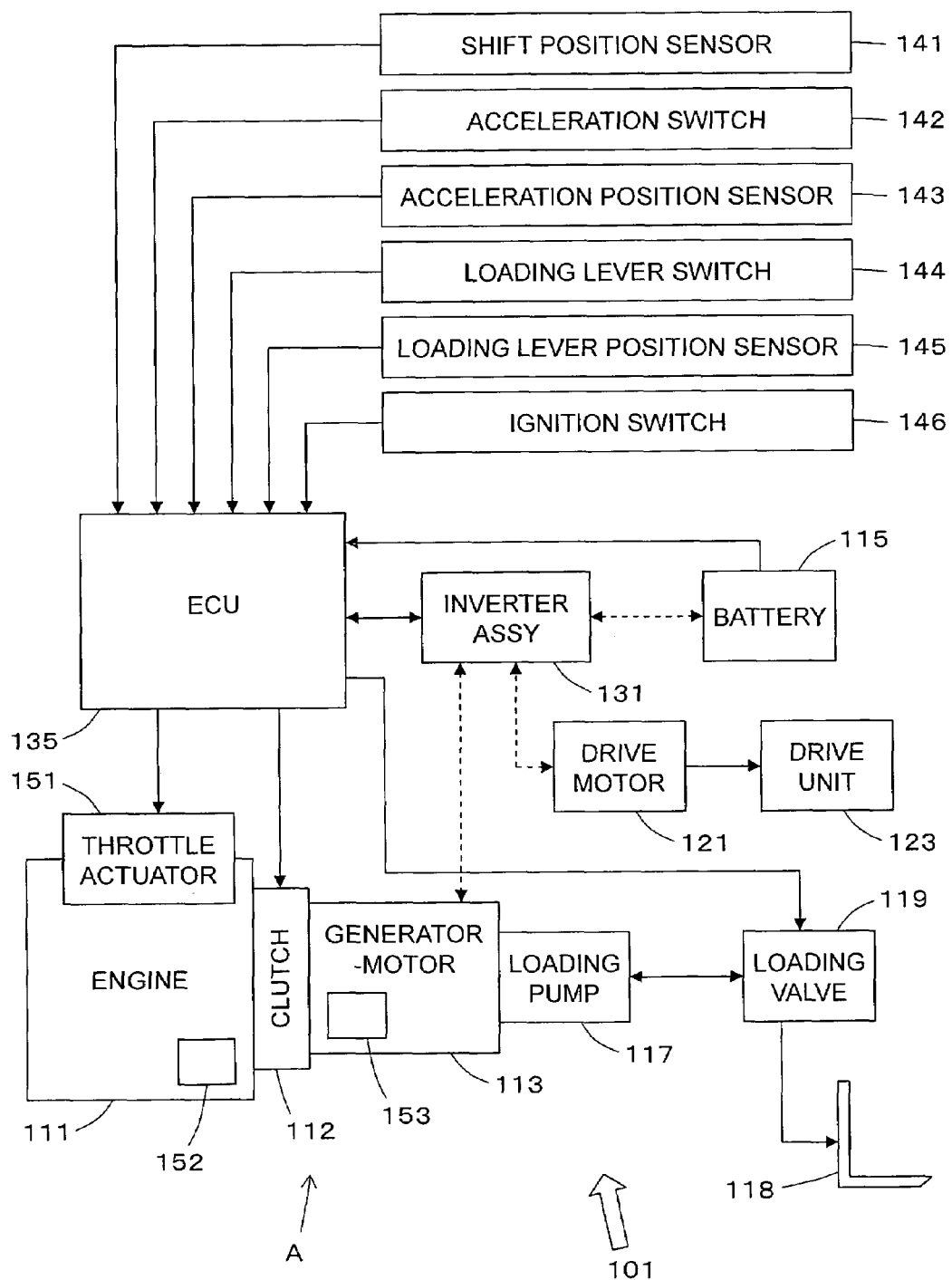
FIG. 1 is a block diagram of a cargo handling apparatus according to a first embodiment of the present invention.

A cargo handling apparatus A of a forklift 101 according to a first embodiment of the present invention, which is shown in FIG. 1, is mainly composed of an engine 111, a generator-motor 113, a battery (electric storage means) 115, a loading pump 117, a loading valve 119, a fork 118, a drive motor 121, a drive unit 123, an inverter assembly 131, and an ECU (controller) 135. Cargo handling means is mainly composed of the loading pump 117, the fork 118, and the loading valve 119.

The engine 111 is driven through a rotation control signal given to a throttle actuator 151 from the ECU 135 to be described later, and a drive shaft (not shown) thereof is coaxially coupled to a drive shaft (not shown) of the generator-motor 113 through a clutch 112 for disconnecting/connecting the power.

The generator-motor 113 is driven by the engine 111 to generate power, and is appropriately switchable between a generator mode of storing the power in the battery 115 and a motor mode in which the generator-motor 113 is driven as a motor by receiving a supply of drive power from the battery 115. This control of switching is performed through the inverter assembly 131 on the basis of a control command of the ECU 135.

In the forklift 101, there are arranged sensors such as a shift position sensor 141, an acceleration switch 142, an acceleration position sensor 143, a loading lever switch 144, a loading lever position sensor (load detection means) 145, and an ignition switch 146. Those are electrically connected to the ECU 135.

When the generator-motor 113 is in the generator mode, the engine 111 serves as a drive source of the generator-motor 113 and the loading pump 117, which are coaxially arranged. Meanwhile, when the generator-motor 113 is in the motor mode, the engine 111 and the generator-motor 113 serve as the drive sources of the loading pump 117. However, it is also possible to release the clutch 112 in the above-described motor mode, and to use only the generator-motor 113 instead of the engine 111 as the drive source of the loading pump 117. The control to release/connect the clutch is performed by a control signal of the ECU 135.

The battery 115 stores the electric power generated by the generator-motor 113 in the generator mode, and appropriately supplies the drive power for a driving operation and a cargo handling operation of the forklift 101. The storage into the battery 115 and the discharge from the battery 115 are controlled through the inverter assembly 131 connected to the ECU 135.

The driving operation of the forklift 101 is performed through the drive motor 121 and the drive unit 123 driven by the drive motor 121. The drive motor 121 is supplied with the drive power from the battery 115 through the inverter assembly 131 to be driven. Further, cargo handling work of the forklift 101 is performed through the loading pump 117, the fork 118, and the loading valve 119 for appropriately distributing an operation fluid from the loading pump 117 to the fork 118.

The ECU 135 administers a system control of the entire forklift 101, and the control includes a storage/discharge control of the battery 115. The ECU 135 appropriately receives information such as shift position information from the shift position sensor 141, acceleration ON/OFF information from the acceleration switch 142, acceleration opening information from the acceleration position sensor 143, loading lever ON/OFF information from the loading lever switch 144, loading lever opening information from the loading lever position sensor 145, ON/OFF information from the ignition switch 146, information on the number of revolution (acquirable by a number of revolution detection sensor 152), temperature, and the like of the engine 111, voltage/temperature information from the battery 115, information on the number of revolution (acquirable by a number of revolution detection sensor 153), an output, temperature, and the like from the generator-motor 113.

Then, from the above-described ECU 135, on the basis of the above-described respective pieces of inputted information, the control signal for the engine 111 is outputted to the throttle actuator 151, and various control signals such as a mode switching signal for the generator-motor 113, a storage control signal for the battery 115, and a control signal for the drive motor 121 are outputted to the inverter assembly 131, thereby executing the system control of the forklift 101.

Next, functions in this embodiment will be described. When a high output is not particularly required for the cargo handling work, the above-described clutch 112 is set to the connected state, and the generator-motor 113 is set to the generator mode. In this state, the engine 111 serves as the drive source of both of the generator-motor 113 in the generator mode and the loading pump 117. Hereinafter, this state is referred to as a "first mode". Note that, in this embodiment, determination as to whether or not the high output is required for the cargo handling work is performed in such a manner that the ECU 135 appropriately checks whether or not a request to drive for cargo handling is high on the basis of the information from the loading lever position sensor 145.

In the above-described first mode, drive force of the engine 111 is transmitted through the clutch 112 in the connected state to the generator-motor 113 in the generator mode, and the electricity generated by the generator-motor 113 is sequentially stored in the battery 115. Further, the loading pump 117 is constantly driven according to a rotational movement of the drive shaft of the engine 111, and sends the operation fluid (pressure oil in this embodiment) to the loading valve 119. When the cargo handling work is not performed, the operation fluid passes through the loading valve 119, and is flown back to a tank (not shown).

In this first mode, when a cargo handling load is small, the ECU 135 makes a control to increase an amount of generated power for the battery 115, and makes a control so that a load applied to the engine 111 can be a suitable load for operating the engine 111 under a predetermined optimum condition. Note that the optimum condition refers to a condition (number of revolution, amount of fuel injection, or the like) where the engine can be operated at the optimum fuel consumption, and is determined by performing experiments and the like. Note that when, for example, the cargo handling load is small and a charged amount of the battery 115 is nearly full, a control may be made by the ECU 135 so that the generator-motor 113 does not generate the power.

When the forklift 101 is made to run, the ECU 135 supplies the drive power from the battery 115 through the inverter assembly 113 to the drive motor 121. The drive motor 121 is driven so that the drive unit 123 coupled to the drive motor 121 performs the driving operation.

When the high output is required for the cargo handling work, that is, when the ECU 135 has determined that the request to drive for cargo handling is high on the basis of the information from the loading lever position sensor 145, the ECU 135 transmits the control signal to switch the generator-motor 113 to the motor mode. Note that in this case, the clutch 112 is set to the connected state in advance. Hereinafter, this state is referred to as a "second mode".

In this second mode, the loading pump 117 is driven by both of the engine 111 and the generator-motor 113 in the motor mode. Hence, the generator-motor 113 in the motor mode assists the drive of the loading pump 117 by the engine 111, and even the engine 111 of a low-output type can sufficiently execute the cargo handling work requiring the high output.

When the ECU 135 has determined that the request to drive for cargo handling is relatively low, and that the output whose extent is such that the engine 111 and the generator-motor 113 in the motor mode must cooperate with each other is not required, the ECU 135 transmits the control signal to switch the generator-motor 113 into the motor mode, and sets the clutch 112 in a disconnection state. In this case, though the generator-motor 113 in the motor mode drives the loading pump 117, the engine 111 is not involved in the drive of the loading pump 117. Hereinafter, this state is referred to as a "third mode".

In this third mode, the engine 111 is set to an idle state or a stopped state, thus making it possible to enhance energy efficiency when the loading pump 117 is driven. Further, the clutch 112 is set to the disconnection state. Accordingly, when the generator-motor 113 is driven, the large load (engine braking) is not applied thereto.

Note that the case is conceivable where during the cargo handling work in the above-described third mode, the cargo handling load is increased because, for example, the opening of the loading lever position sensor 145 is increased. Upon detecting the increase of the cargo handling load, the ECU 135 investigates a degree (radicalness) of increase of this cargo handling load. For example, when the loading lever is inclined by a predetermined angle or more within a predetermined time, the ECU 135 determines that the degree (radicalness) of increase of the cargo handling load is large.

When the ECU 135 determines that the degree of increase of the cargo handling load falls below a predetermined value, the ECU 135 sends the control signal to the inverter assembly 131, and simply increases the output of the generator-motor 113 in the motor mode, thereby coping with the increase of the cargo handling load. In this case, the above-described clutch 112 remains in the disconnection state, and the engine 111 is set to the idle state or the stopped state, thus making it possible to enhance the energy efficiency.

Meanwhile, when the degree of increase of the cargo handling load is the predetermined value or more, the ECU 135 makes a control to increase the output of the generator-motor 113 in the motor mode, and to immediately start the increase of the number of revolution of the engine 111. Note that, when the engine 111 is stopped, the ECU 135 immediately starts the engine 111 by a starter motor (not shown), and starts the increase of the number of revolution. The generator-motor 113 can be quickly shifted to a high-output state in comparison with the engine 111, and a delay of the cargo handling work can be minimized, or the delay can be reduced substantially to zero. Note that at the time of starting the increase of the number of revolution of the engine, the clutch 112 is left in the disconnection state.

Thereafter, the ECU 135 monitors the number of revolution of the generator-motor 113 by the number of revolution detection sensor 153, and monitors the number of revolution of the engine 111 by the number of revolution detection sensor 152. Then, when the number of revolution of the engine 111 is made equal to the number of revolution of the generator-motor 113, the ECU 135 sets the clutch 112 in the connected state, and makes a control to drive the loading pump 117 by the large output of the engine 111. After the clutch 112 is set to the connected state, the drive of the generator-motor 113 in the motor mode may be stopped, or the drive may be continued to assist the output of the engine 111.

As described above, when the cargo handling load is relatively small, the above-described third mode is employed, and the engine 111 is idled or stopped, thus enhancing the energy efficiency (fuel consumption). In addition, when the load is increased by a predetermined amount or more (radically) in this third mode, the drive is switched to the drive of the loading pump 117 by the engine 111 (or the drive of the loading pump 117 by the engine 111 and the generator-motor 113 in the motor mode), thus making it possible to perform the cargo handling work lightly by utilizing the large output by the engine 111. Further, though it is inevitable that some time lag occurs until the engine 111 that has been in the idle state or the stopped state is shifted to the high-output state to set the clutch 112 in the connected state, the period concerned can be dealt with by quickly increasing the output of the generator-motor 113. Accordingly, there is no fear for the delay of the cargo handling work owing to a lowering of operation responsiveness, and the efficiency of the cargo handling work is not lowered.

Further, the control here is a control to set the clutch 112 in the connected state after the number of revolution of the engine 111 is made equal to the number of revolution of the generator-motor 113. Accordingly, the number of input revolutions of the loading pump 117 is also prevented from temporarily being lowered at the time the clutch 112 is set to the connected state. Hence, there is no case where the rising speed of the fork 118 temporarily falls during work of lifting up a cargo, resulting in generation of uncomfortable vibrations on a base or in a delay of the cargo handling work. Further, the control here is a control to set the clutch 112 in the connected state when both numbers of revolutions coincide with each other. Accordingly, seizing, wearing, and the like of the clutch 112 can also be avoided to thereby prolong a lifetime thereof.

Note that such a construction can also be adopted in which when the ignition switch 146 detects an ON operation when the engine 111 is in the stopped state, the ECU 135 can set the clutch 112 in the connected state and can drive the generator-motor 113 in the motor mode, thereby starting the engine 111. In such a way, the dedicated starter motor can be omitted, thus making it possible to contribute to downsizing of the forklift 101 and reduce the number of parts and manufacturing cost. Further, the generator-motor 113 in the motor mode is usually designed to have larger torque than the starter motor does. Accordingly, vibrations at the time of cranking can be reduced.

Further, a construction, in which the engine 111 is started by cooperation of the starter motor and the generator-motor 113, can also be adopted. In this case, as the dedicated starter motor, a compact one (inexpensive one) having small torque can be employed, thus making it possible to achieve compactness of the forklift 101 and reduce the manufacturing cost.

Second Embodiment

Figure 2:
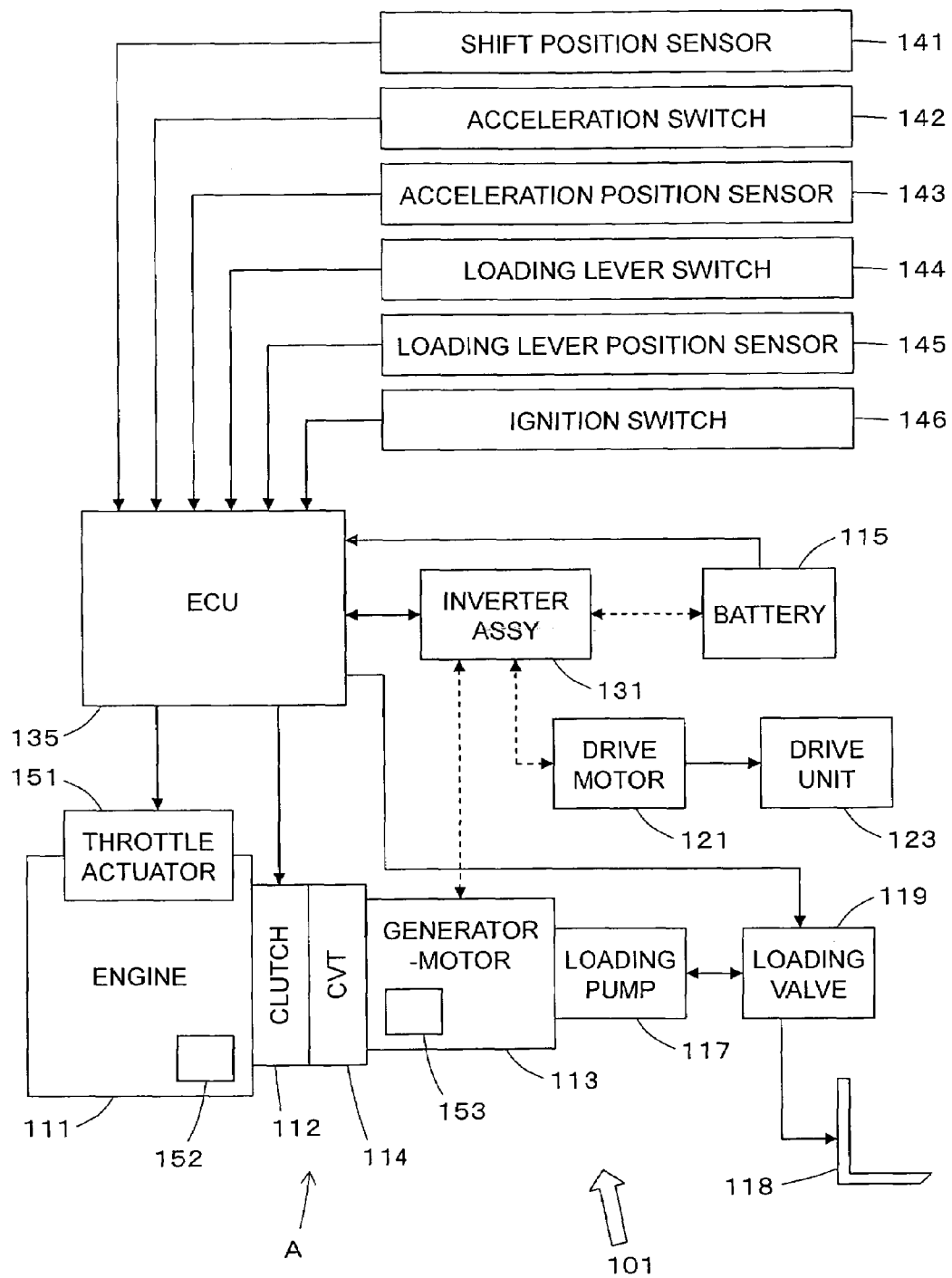
FIG. 2 is a block diagram of a cargo handling apparatus according to a second embodiment of the present invention.

FIG. 2 is a block diagram showing a construction of a forklift of a second embodiment. In comparison with the above-described first embodiment, this second embodiment is different therefrom in that a CVT (continuously variable transmission) 114 is interposed between the generator-motor 113 and the engine 111. It is possible to control a transmission gear ratio of this CVT 114 by a control signal from the ECU 135.

With this construction, when, for example, the opening of the loading lever, which is detected by the loading lever position sensor 145, is increased during the cargo handling work in the above-described third mode (where the clutch 112 is in the disconnection state, and the engine 111 is in the idle state or the stopped state) to cause the increase of the cargo handling load, and the degree of increase of the cargo handling load is the predetermined value or more, a control is made to increase the output of the generator-motor 113 in the motor mode, and to immediately start the increase of the number of revolution of the engine 111. Note that when the engine 111 is stopped, the engine 111 is started immediately, and the increase of the number of revolution of the engine is started.

As in the above-described first embodiment, in this second embodiment, the clutch 112 is left in the disconnection state at an initial stage of the above-described increasing control of the number of revolution of the engine. However, even at a stage where the number of revolution of the engine 111 is smaller than the number of revolution of the generator-motor 113, when the number of revolution of the engine, of which speed has been increased by the CVT 114, is made equal to the number of revolution of the generator-motor 113, the clutch 112 is set to the connected state to perform a control to shift the drive of the loading pump 117 to the drive by the engine 111. Note that since the clutch 112 is in the disconnection state at the beginning of the increasing control of the number of revolution of the engine 111, the power of the engine 111 is not transmitted to the CVT 114. However, the ECU 135 sets the clutch 112 in the connected state when the number of revolution of the engine after gear shift is calculated on the basis of the above-described detection sensor 152 and a transmission ratio of the CVT 114 on the assumption that the clutch 112 has been set to the connected state and the power of the engine 111 has been shifted by the CVT 114 and when the obtained number of revolution is made equal to the number of revolution of the generator-motor 113.

With this construction of FIG. 2, by appropriately setting the transmission ratio of the CVT 114, it becomes easy to synchronize the engine 111 and the generator-motor 113 with each other. In particular, even in a state where only little time has been elapsed since the increasing control of the number of revolution of the engine 111 was started, and the number of revolution of the engine is in a low state, the clutch 112 can be set to the connected state to transmit the drive force of the engine 111 to the loading pump 117 after appropriately setting the transmission ratio of the CVT 114, and the generator-motor 113 can be assisted at an earlier stage. Hence, even when the load is radically increased, it is possible to prevent the operation of the generator-motor 113 alone under the large load from continuing for a long time, and a lifetime of the generator-motor 113 can be prolonged. Further, the clutch 112 is set to the connected state when the number of revolution of the engine whose speed has been increased by the CVT 114 is made equal to the number of revolution of the generator-motor 113. Accordingly, it is also possible to prevent the number of input revolutions of the loading pump 117 from temporarily being lowered at the time the clutch 112 is set to the connected state, and the seizing, wearing, and the like of the clutch 112 can also be avoided.

In the construction of FIG. 2, after the clutch 112 is connected, the ECU 135 monitors the changes of the numbers of revolutions of the engine 111 and the generator-motor 113 by the number of revolution detection sensors 152 and 153. According to results of the monitoring, the ECU 135 changes the transmission ratio of the CVT 114. Specifically, the transmission ratio of the CVT 114 is controlled to be changed so as to maintain a synchronized state of the engine 111 and the generator-motor 113. In such a way, even during a period in which the number of revolution of the engine 111 is increased from the low state to be then equal to the number of revolution of the generator-motor 113, the drive force of the engine 111 can be transmitted to the loading pump 117.

Note that in this construction according to the second embodiment of the present invention, the following is also possible in the above-described third mode: the engine 111 is set not in the idle state but in the stopped state in advance; when the radical increase of the cargo handling load has been detected, the output of the generator-motor 113 in the motor mode is increased; and substantially simultaneously therewith, the above-described clutch 112 is set to the connected state, thus allowing the generator-motor 113 to start the engine 111. In this construction, by appropriately setting the transmission ratio of the CVT 114, the output of the generator-motor 113, with its speed being reduced and its torque being increased by the CVT 114, rotates the output shaft of the engine 111. Hence, the engine 111 can be started without applying any excessive load to the generator-motor 113. Further, in the above-described construction, it is needless to say that the dedicated starter motor can be omitted or downsized as in the above-described first embodiment, thus making it possible to contribute to the cost reduction and the like.

Note that though the CVT 114 is interposed between the clutch 112 and the generator-motor 113 in the construction of FIG. 2, a position of the CVT 114 is not limited to this construction, and a construction may also be adopted, for example, in which the CVT 114 is interposed between the clutch 112 and the engine 111.

Third Embodiment

Figure 3:
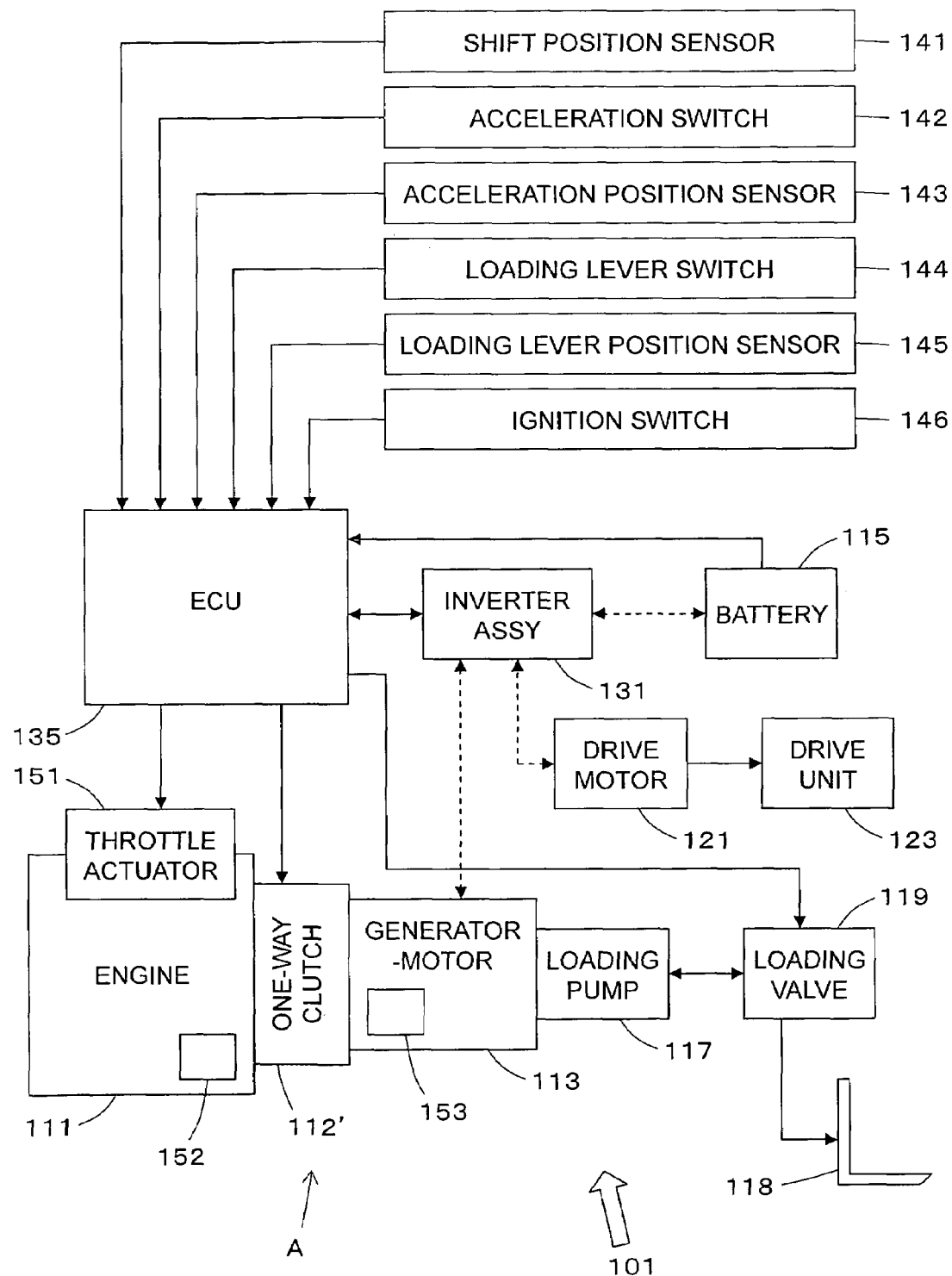
FIG. 3 is a block diagram of a cargo handling apparatus according to a third embodiment of the present invention.

A forklift of a third embodiment of the present invention is shown in FIG. 3. This forklift 101 is constructed such that a one-way clutch 112' is provided between the generator-motor 113 and the engine 111 in place of the clutch 112 in the construction of FIG. 1.

With this construction, when the generator-motor 113 is driven in the above-described third mode while the engine 111 is set to the idle state or the stopped state, since the number of revolution of the engine 111 is smaller than the number of revolution of the generator-motor 113, the one-way clutch 112' is automatically set to the disconnection state. Hence, the large load (engine braking) is prevented from being applied to the generator-motor 113 in case of driving the loading pump 117 by driving the generator-motor 113 in this third mode.

Then, when, for example, the opening of the loading lever, which is detected by the loading lever position sensor 145, is increased during the cargo handling work in the above-described third mode to cause the increase of the cargo handling load, and the degree of increase of the cargo handling load is the predetermined value or more, a control is made to increase the output of the generator-motor 113 in the motor mode, and to immediately start the increase of the number of revolution of the engine 111. Note that when the engine 111 is stopped, the engine 111 is immediately started, and the increase of the number of revolution of the engine is started.

According to this third embodiment of the present invention, at a stage where the number of revolution of the engine 111 is made equal to the number of revolution of the generator-motor 113 as a result of a gradual increase of the number of revolution of the engine 111, the above-described one-way clutch 112' is automatically connected, and the drive force of the engine 111 is transmitted to the loading pump 117. According to the construction of FIG. 3, it is unnecessary to perform, on the ECU 135 side, the control as described above to connect the clutch after waiting for the following of the number of revolution of the engine. Therefore, the load on the ECU 135 can be reduced, and an electric construction thereof can be simplified. Further, it is unnecessary to make an electric control. Accordingly, a frequency of failure can be reduced, and the number of times of necessary maintenance can also be reduced.

Note that in this third embodiment of the present invention, too, the CVT 114 as described in the second embodiment of the present invention may be used while being interposed between the one-way clutch 112' and the generator-motor 113, for instance. However, in this third embodiment of the present invention, even if the engine 111 is to be started from the generator-motor 113 side, it is impossible to start the engine 111 since the one-way clutch 112' is set to the disconnection state. The engine 111 must be started by the dedicated starter motor.

Hereinabove, the plurality of embodiments and their modification examples according to the present invention have been described; however, the present invention can be embodied by further making alterations thereto as follows.

Figure 4:
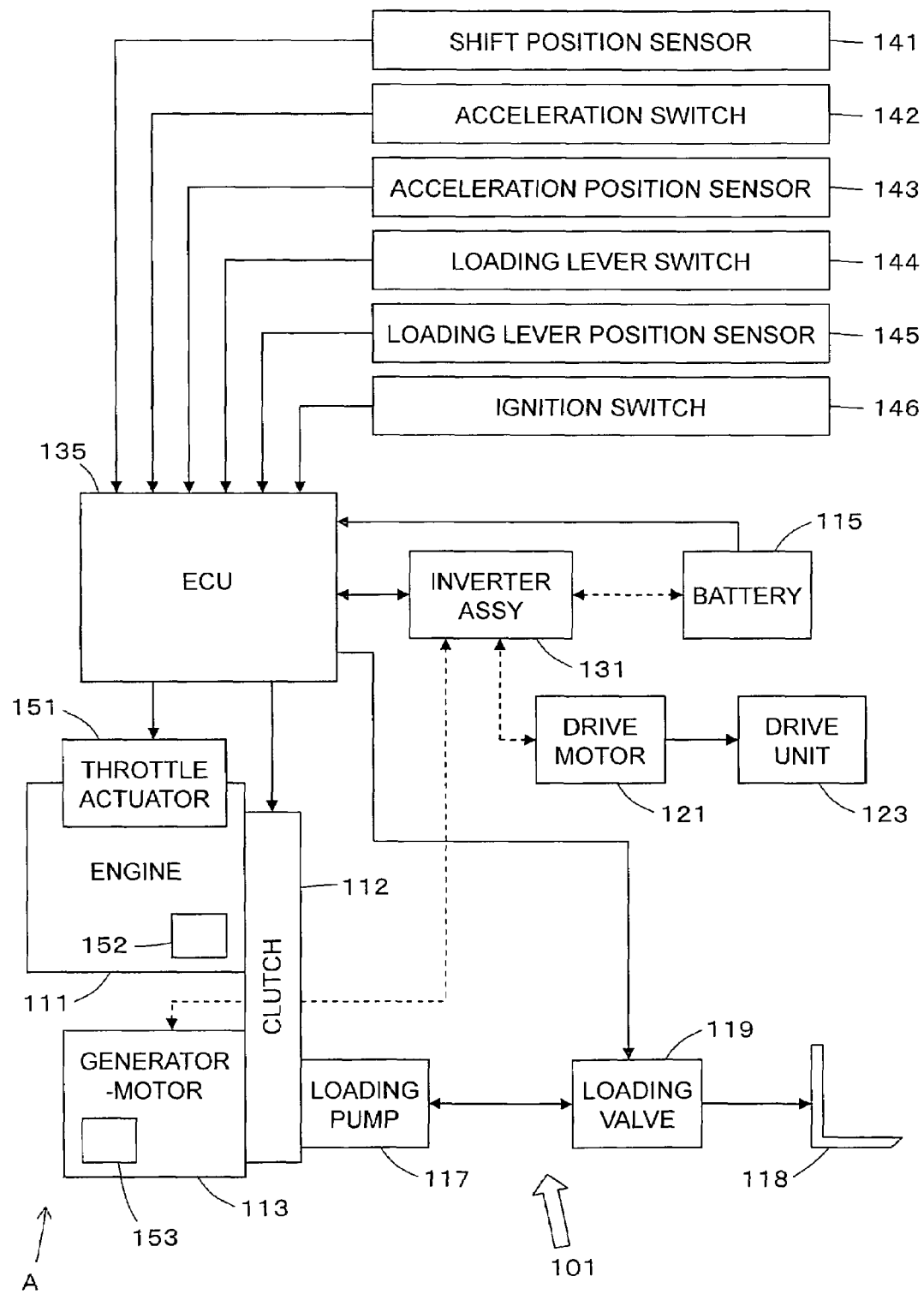
FIG. 4 is a block diagram showing a modification example of the cargo handling apparatus.

(1) As in a construction of FIG. 4, the generator-motor 113 can be disposed at a side of the engine 111 instead of being disposed coaxially with the engine 111. In this case, it is recommended that the clutch 112 be made as, for example, a belt clutch, and the power be connected/disconnected between the engine 111 and the generator-motor 113.

Figure 5:
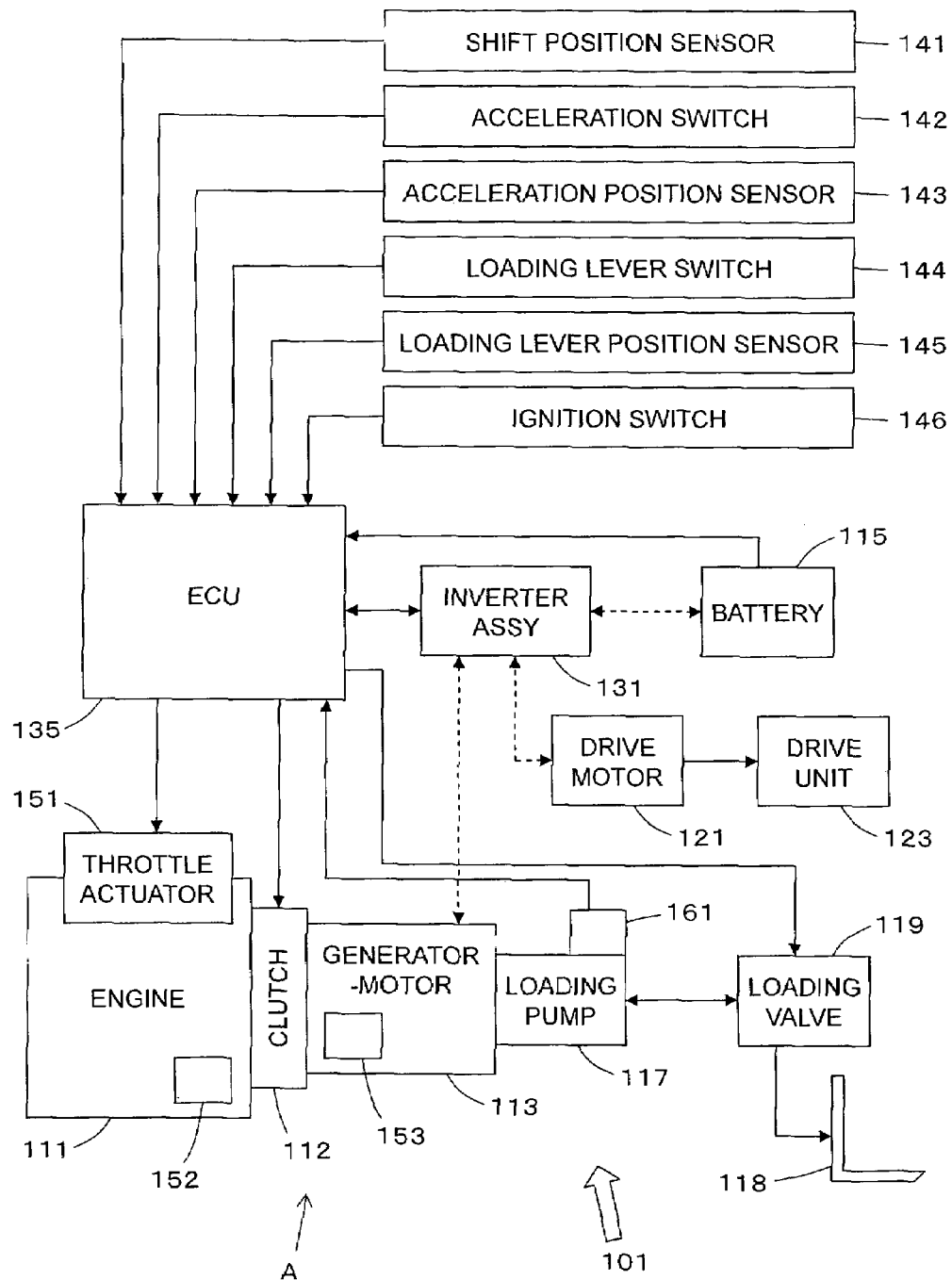
FIG. 5 is a block diagram showing another modification example of the cargo handling apparatus.
Figure 6:
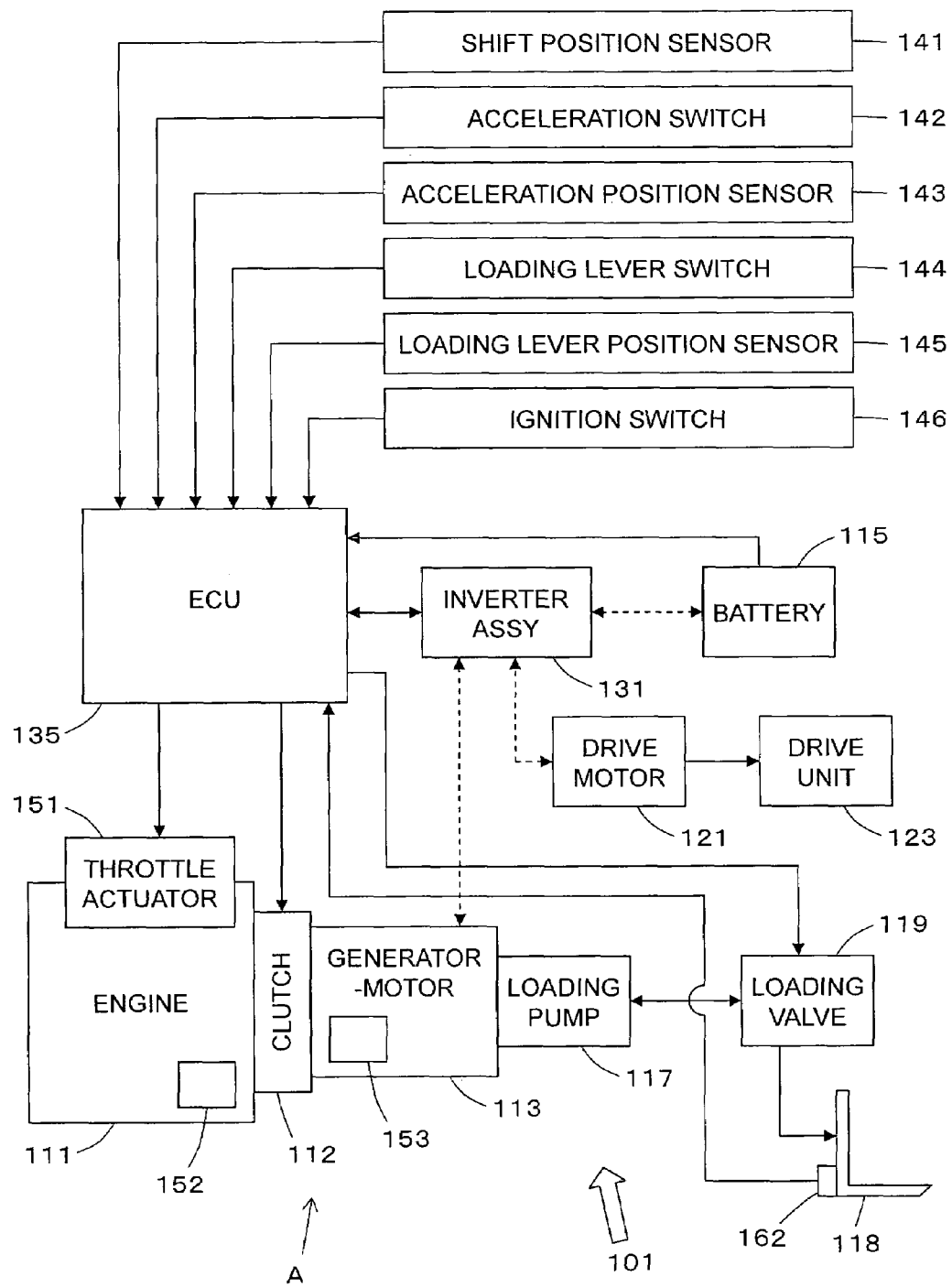
FIG. 6 is a block diagram showing still another modification example of the cargo handling apparatus.

(2) Although the loading lever position sensor 145 is used as the load detection means for detecting the cargo handling load in the first to third embodiments of the present invention, the load detection means is not limited to this. For example, as shown in FIG. 5, pressure of the pressure oil discharged from the loading pump 117 is detected by a pressure sensor 161, and it may be determined that the cargo handling load is high if the detected pressure is high. Further, as shown in FIG. 6, a load sensor 162 is provided at an appropriate position of the fork 118, thereby making it possible to detect weight of a cargo in case of lifting up the cargo by the fork 118, and it may be determined that the cargo handling load is high if the detected weight of the cargo is large. Of course, a construction to comprehensively determine the cargo handling load by combining the detected values of the above-described loading lever position sensor 145, the above-described pressure sensor 161, and the above-described cargo sensor 162, may also be adopted.

(3) In the first to third embodiments of the present invention, the degree of radicalness of the increase of the load detected by the cargo handling load detection means is calculated, thereby making the above-described increasing control of the output of the generator-motor 113 and the above-described increasing control of the number of revolution of the engine. However, without being limited to this, the increasing control of the output of the generator-motor 113 and the increasing control of the number of revolution of the engine may be made under a condition where the value itself of the detected load is the predetermined value or more.

(4) The above-described loading pump 117 is constructed to send the operation fluid (pressure oil) with pressure to the loading valve 119. However, a construction can also be adopted in which: a power steering device, a brake device, and the like, which are operated by the oil pressure, are provided in the forklift 101; and the pressure oil is distributed and sent with pressure to the above-described devices as well as to the loading valve 119. In this case, it is possible to allow the single loading pump 117 to serve also as a pressure oil source for the power steering device, the brake device, and the like. In such a way, the number of parts can be reduced to attain compactness, and the cost can also be reduced.

(5) The cargo handling apparatus of the present invention can also be applied to other cargo handling industrial vehicles in general without being limited to the forklift.

The invention claimed is:

1. A cargo handling apparatus of a cargo handling industrial vehicle, comprising:
   an engine;
   a generator-motor;
   a clutch for connecting/disconnecting a transmission of power between the engine and the generator-motor;
   electric storage means connected to the generator-motor;
   cargo handling means for performing cargo handling work;

load detection means for detecting an amount of a cargo handling load; and a controller, wherein the generator-motor is driven in one of: a generator mode of generating electric power by being driven by power of the engine transmitted through the clutch and storing the electric power in the electric storage means; and a motor mode of being driven as a motor by receiving a supply of electric power from the electric storage means, when the load detected by the load detection means is smaller than a predetermined value, the controller sets the engine in a stopped or idle state, disconnects the transmission of the power between the engine and the generator-motor by the clutch, and drives the cargo handling means by the generator-motor in the motor mode, thereby performing the cargo handling work;

when the load detected by the load detection means becomes the predetermined value or more during the cargo handling work in a state where the transmission of the power between the engine and the generator-motor is disconnected by the clutch, the controller starts an increase of the number of revolution of the engine while increasing an output of the generator-motor in the motor mode, and when the number of revolution of the engine is made equal to the number of revolution of the generator-motor, the controller connects the transmission of the power between the engine and the generator-motor by the clutch, and drives the cargo handling means by both of the power of the engine and the power of the generator-motor, thereby performing the cargo handling work.

2. A cargo handling apparatus of a cargo handling industrial vehicle according to claim 1, further comprising a continuously variable transmission disposed between the engine and the generator-motor.

3. A cargo handling apparatus of a cargo handling industrial vehicle according to claim 2, wherein, when the number of revolution of the engine, which is shifted by the continuously variable transmission, is made equal to the number of revolution of the generator-motor after the increase of the number of revolution of the engine is started, the transmission of the power between the engine and the generator-motor is connected by the clutch.

4. A cargo handling apparatus of a cargo handling industrial vehicle according to claim 3, wherein, after the number of revolution of the engine, which is shifted by the continuously variable transmission, is made equal to the number of revolution of the generator-motor, and the transmission of the power between the engine and the generator-motor is connected by the clutch, a transmission ratio of the continuously variable transmission is controlled to be changed according to the increase of the number of revolution of the engine.

5. A cargo handling apparatus of a cargo handling industrial vehicle according to claim 4, wherein the transmission ratio of the continuously variable transmission is controlled to be changed to maintain a synchronized state of the engine and the generator-motor according to the increase of the number of revolution of the engine.

6. A cargo handling apparatus of a cargo handling industrial vehicle according to claim 1, wherein the controller sets the clutch in a disconnection state when the load detected by the load detection means is smaller than the predetermined value, and sets the clutch in a connected state when the increased number of revolution of the engine is made equal to the number of revolution of the generator-motor in a case that the load detected by the load detection means during the cargo handling work in the state where the transmission of the power between the engine and the generator-motor is disconnected by the clutch becomes the predetermined value or more.

7. A cargo handling apparatus of a cargo handling industrial vehicle according to claim 1, wherein:

the clutch is composed of a one-way clutch;

when the load detected by the load detection means is smaller than the predetermined value, the engine is set to a stopped or idle state to automatically disconnect the transmission of the power between the engine and the generator-motor; and in this state, when the increased number of revolution of the engine is made equal to the number of revolution of the generator-motor in a case that the load detected by the load detection means becomes the predetermined value or more, the transmission of the power between the engine and the generator-motor is automatically connected.

8. A cargo handling apparatus of a cargo handling industrial vehicle according to claim 1, wherein the cargo handling means includes a fork, and a loading pump discharging pressure oil for moving the fork.

9. A cargo handling apparatus of a cargo handling industrial vehicle according to claim 1, wherein the load detection means includes a loading lever position sensor detecting an opening of a loading lever.

10. A cargo handling apparatus of a cargo handling industrial vehicle according to claim 8, wherein the load detection means includes a pressure sensor detecting pressure of the pressure oil discharged from the loading pump.

11. A cargo handling apparatus of a cargo handling industrial vehicle according to claim 8, wherein the load detection means includes a load sensor detecting weight of a cargo lifted up by the fork.

* * * * *

UNITED STATES PATENT AND TRADEMARK OFFICE
CERTIFICATE OF CORRECTION

PATENT NO.        : 7,464,778 B2
APPLICATION NO.   : 10/567531
DATED             : December 16, 2008
INVENTOR(S)       : Norihiko Kato et al.

It is certified that error appears in the above-identified patent and that said Letters Patent is hereby corrected as shown below:

Column 1, lines 62-63, please delete "from the engine side in case of driving the generator-motor" and insert therefore -- from the engine side in the case of driving the generator-motor --;

Column 5, line 26, please delete "and is flown back to a tank (not shown)." and insert therefore -- and flows back to a tank (not shown). --;

Column 5, lines 41-42, please delete "battery 115 through the inverter assembly 113" and insert therefore -- battery 115 through the inverter assembly 131 --; and Column 8, lines 25-26, please delete "where only little time has been elapsed" and insert therefore -- where only little time has elapsed --.

Signed and Sealed this

Twentieth Day of October, 2009

David J. Kappos
*Director of the United States Patent and Trademark Office*